W. B. LASHAR.
DUAL TIRE GRIP.
APPLICATION FILED MAY 14, 1913.
1,216,464.
Patented Feb. 20, 1917.
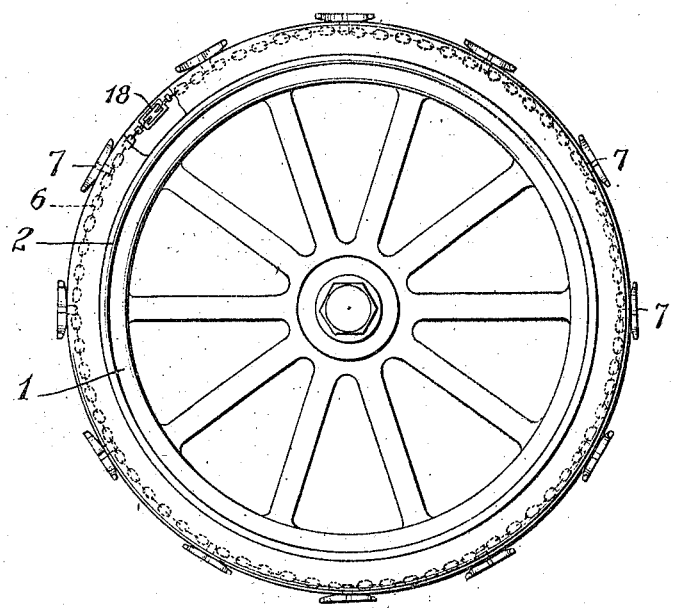
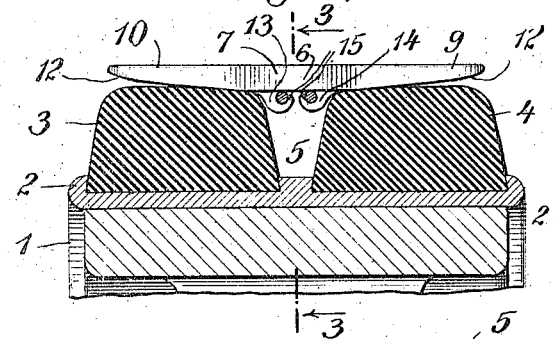
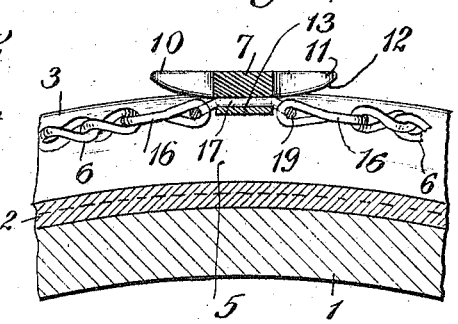
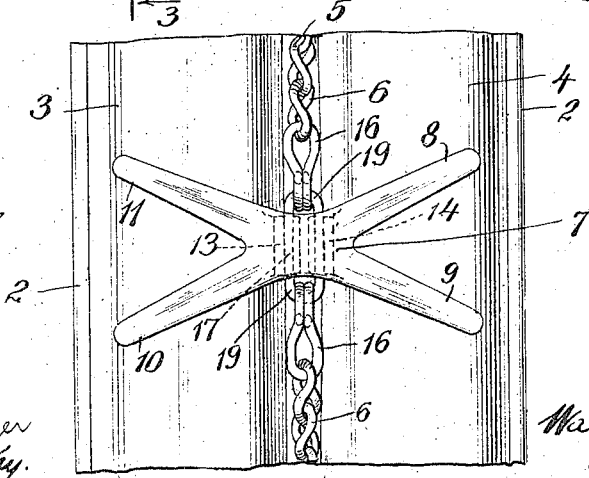
WITNESSES
INVENTOR
Walter B Lashar
BY
Duncan & Duncan ATTORNEYS

UNITED STATES PATENT OFFICE.

WALTER B. LASHAR, OF BRIDGEPORT, CONNECTICUT, ASSIGNOR TO AMERICAN CHAIN COMPANY, INCORPORATED, OF BRIDGEPORT, CONNECTICUT, A CORPORATION OF NEW YORK.

DUAL-TIRE GRIP.

1,216,464.  Specification of Letters Patent.  Patented Feb. 20, 1917.

Application filed May 14, 1913. Serial No. 767,530.

*To all whom it may concern:*

Be it known that I, WALTER B. LASHAR, a citizen of the United States, and resident of Bridgeport, Fairfield county, Connecticut, have made certain new and useful Inventions Relating to Dual-Tire Grips, of which the following is a specification, taken in connection with the accompanying drawing, forming part of the same.

This invention relates especially to tire grips adapted for use on wheels provided with dual resilient tires of the solid type, the grip preferably comprising a series of about a dozen or so metallic grip units which may be of integral construction and with advantage provided with substantially flat working faces and inwardly projecting holding lugs to connect thereto a securing link coöperating with connectors extending between the different grip units and adapted to extend sufficiently within the annular recess in the tire to maintain the units in proper alinement. The grip units may be provided with any desired number of diagonally arranged arms, two arms giving good results when extending laterally from the body of the unit on both sides thereof at about 50 degrees apart, it being desirable to make the arms of gradually decreasing thickness as they extend away from the body so as to more readily embed themselves in the tire.

In the accompanying drawing showing in a somewhat diagrammatic way several illustrative embodiments of the invention, Figure 1 is a side view of a wheel to which the grip has been applied.

Fig. 2 is an enlarged transverse section through the tire thereof.

Fig. 3 is a side sectional view substantially along the line 3—3 of Fig. 2; and

Fig. 4 is a face view of a portion of the grip and tire.

This grip is adapted to coöperate with multiple solid tire wheels having any suitable construction, the wheel illustrated having the felly 1 and metallic rim 2 thereon in which the desired number of tires preferably of the solid type may be arranged, such as 3, 4, which may, as indicated have the annular recess 5 between them, these tires of course being held in place in any suitable way which it is unnecessary to show in detail. The illustrative form of grip may comprise a suitable series of metallic grip units preferably having substantially flat working faces for contact with the ground, some 8 to 16 or so of such units being useful and 12 units of this kind giving good results on many classes of vehicles.

These grip units may with advantage be made integral and formed of suitable tough resistant material, such as tough steel for example. The grip units may as illustrated comprise a suitable central portion or body from which the desired number of arms extend laterally on both sides of the tire, at suitable angles preferably of about 40 to 70 degrees where four arms are used, to give a sufficiently diagonal arrangement to minimize side slip or skidding, while still maintaining ample traction in connection with the road surface. The body of the grip unit 7 may as indicated in Fig. 4 be provided with four diagonally arranged arms 8, 9, 10 and 11 which may extend laterally entirely or part way across the adjacent tires and be about 50 degrees apart, this diagonal arrangement also promoting the gradual embedding of these arms into the yielding tire so as to correspondingly minimize bumping or other undesirable effects. For this purpose it is also desirable to make the arms of gradually decreasing thickness as they extend away from the body 7 toward the tips or points 12 as shown in Figs. 2 and 3, and for this and structural reasons it is also desirable in some cases to give the arms a more or less gradually decreasing width as they extend away from the body.

Any desired form of securing means may be employed in connection with these grip units and the units may be provided with securing members formed integral therewith or otherwise connected thereto. As shown in the drawings the securing member may with advantage be in the form of a securing link 17 extending inside the body 7 of the grip unit and having its securing ends 19 preferably bent inward or downward as indicated in Fig. 3. Such securing link may be conveniently held in proper position by forming on the grip unit integral holding lugs, such as 13, 14, which may be bent over the sides of the securing member so that their ends 15 securely grip the same and hold it in proper position especially in connection with the downwardly bent ends which minimize longitudinal shifting of the links. Any suitable form of connectors may be attached to the securing members or links on the grip units, the connectors and securing members being preferably located well within the working faces of the units to prevent undesirable contact with the road and abrasion and in this way also the connectors are adapted to lie within the annular groove between the tire sections so as to maintain the unit in proper lateral alinement. Suitable connector chains may be used for this purpose and as illustrated sections of curbed chain 6 may be provided at each end with doubled connector hooks 16, such as are used in connection therewith for tread or cross chains for regular chain grips. These attaching hooks are adapted to engage the ends of the securing links so as to space the grip units the desired distance apart around the tire and one or more of these connector chains may be provided with a suitable tightener such as 18 shown in Fig. 1 to allow the convenient assembly of the grip on the wheel and to enable it to be tightened from time to time to the desired extent.

Grips of this character have proved highly desirable under service conditions because of their long service due to the fact that the grips units which alone come in contact with the ground are formed of heavy and strong material having ample wearing properties, all other parts being located inside or away from the working faces of the units. As shown in Figs. 2 and 3 the lateral extending arms of which two more or less may be used on each side of the unit and project sufficiently away from the tire tread to give ample traction and to prevent slipping on the usual road surfaces. The diagonal arrangement of these arms promotes the gradual embedding thereof into the tire so as to correspondingly promote good riding conditions and the diagonal arrangement, especially where four or more arms are used also greatly minimize side slip.

This invention has been described in connection with a number of illustrative embodiments, forms, proportions, parts, materials and arrangements, to the details of which disclosure the invention is not of course to be limited, since what is claimed as new and what is desired to be secured by Letters Patent is set forth in the appended claims:

1. The tire grip adapted for use on wheels provided with dual resilient solid type tires, comprising a series of about a dozen integral metallic grip units having substantially flat working faces, each unit being formed with a body provided with inwardly projecting holding lugs, a securing link having its central portion gripped by said holding lugs and having inwardly bent securing ends, said grip unit having four diagonally arranged arms extending laterally from said body on both sides thereof and about fifty degrees apart on each side, said arms being of gradually decreasing width and thickness away from said body, and flexible connector chains provided with doubled connector hooks engaging the ends of said securing links to connect said grip units and adapted to extend within the annular recess in the tire to maintain said units in substantial alinement.

2. The tire grip adapted for use on wheels provided with dual resilient solid type tires, comprising a series of integral metallic grip units having substantially flat working faces, each unit being formed with a body provided with inwardly projecting holding lugs, a securing link gripped by said holding lugs, said grip unit having four diagonally arranged arms extending laterally from said body on both sides thereof, said arms being of gradually decreasing thickness away from said body, and connector chains engaging the ends of said securing links to connect said grip units and adapted to extend within the annular recess in the tire to maintain said units in substantial alinement.

3. The tire grip adapted for use on wheels provided with dual resilient solid type tires, comprising a series of integral metallic grip units having substantially flat working faces, each unit being formed with a body and a connected securing member, said grip unit having four diagonally arranged arms extending laterally from said body on both sides thereof and about fifty degrees apart on each side, said arms being of gradually decreasing thickness away from said body, and flexible connectors engaging said securing members to connect said grip units and adapted to extend within the annular recess in the tire to maintain said units in substantial alinement.

4. The tire grip adapted for use on wheels provided with dual resilient solid type tires, comprising a series of metallic grip units, each formed with a body and a connected securing member, said grip unit having four diagonally arranged arms extending laterally from said body on both sides thereof, said arms being of gradually decreasing thickness away from said body, and connectors engaging said securing members to connect said grip units and adapted to extend within the annular recess in the tire to maintain said units in substantial alinement.

5. The tire grip adapted for use on wheels provided with dual resilient solid type tires, comprising a series of metallic grip units having substantially flat working faces, each unit being formed with a body and a plurality of diagonally arranged arms extending laterally from said body on both sides thereof, said arms being of decreasing thickness away from said body, and chain connectors to connect said grip units and adapted to extend within the annular recess in the tire to maintain said units in substantial alinement.

6. The integral metallic tire grip unit adapted for use on wheels provided with dual resilient solid type tires having a substantially flat working face and formed with a body provided with inwardly projecting holding lugs, a securing link having its central portion gripped by said holding lugs and having inwardly bent securing ends, said grip unit having four diagonally arranged arms extending laterally from said body on both sides thereof and about fifty degrees apart on each side, said arms being of gradually decreasing width and thickness away from said body.

7. The integral metallic tire grip unit adapted for use on wheels provided with dual resilient solid type tires having a substantially flat working face and formed with a body provided with inwardly projecting holding lugs, a securing link having its central portion gripped by said holding lugs and having inwardly bent securing ends, said grip unit having four diagonally arranged arms extending laterally from said body on both sides thereof, said arms being of decreasing thickness away from said body.

8. The metallic tire grip unit adapted for use on wheels provided with dual resilient solid type tires having a substantially flat working face and formed with a body and a connected securing member located inward away from the working face of the unit, said grip unit having a plurality of diagonally arranged arms extending laterally from said body on both sides thereof, said arms being of decreasing thickness away from said body.

9. The metallic tire grip unit adapted for use on wheels provided with dual resilient solid type tires having a substantially flat working face and formed with a body and a connected substantially central securing member located inward away from the working face of the unit, said grip unit having a plurality of diagonally arranged arms extending laterally from said body on both sides thereof, said arms being of decreasing thickness away from said body.

WALTER B. LASHAR.

Witnesses:
HARRY L. DUNCAN,
JESSIE B. KAY.